March 15, 1960 W. RUEGGEBERG 2,928,924
DEVIATION AMPLIFIER AND CONTROL SYSTEM
Filed May 9, 1957
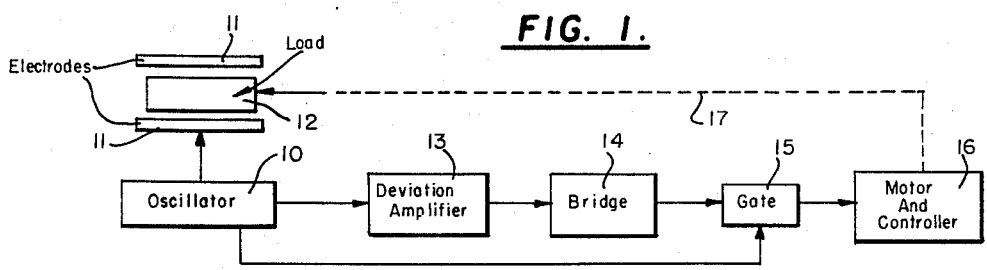
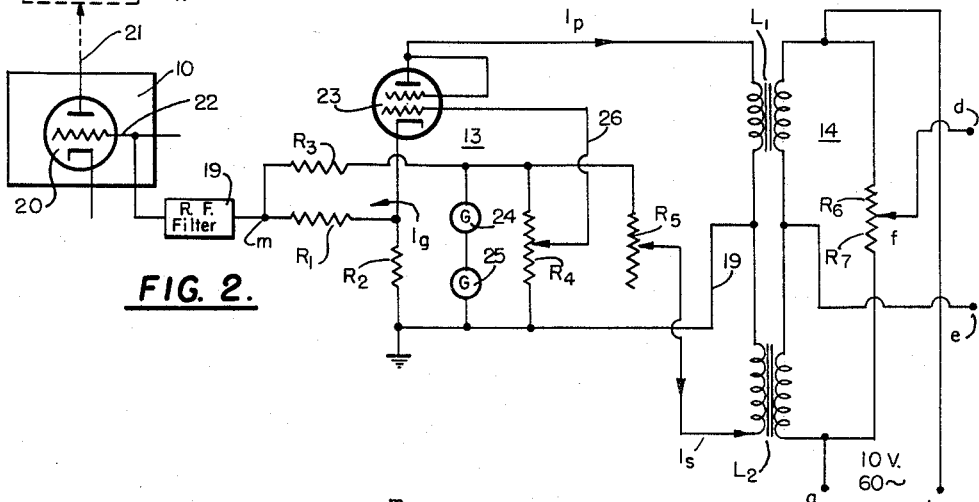
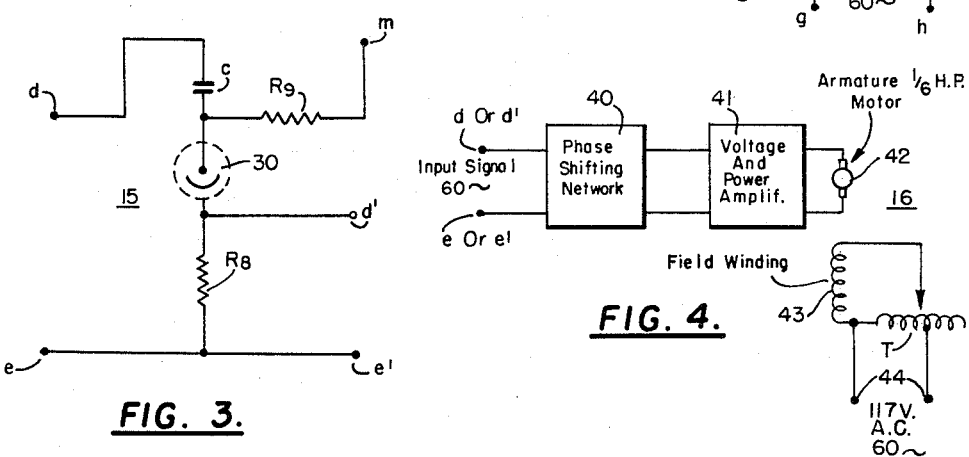
INVENTOR
Werner Rueggeberg
ATTORNEY

United States Patent Office 2,928,924
Patented Mar. 15, 1960

2,928,924

DEVIATION AMPLIFIER AND CONTROL SYSTEM

Werner Rueggeberg, Lancaster, Pa., assignor to Armstrong Cork Company, Lancaster, Pa., a corporation of Pennsylvania Application May 9, 1957, Serial No. 658,174

25 Claims. (Cl. 219—10.77)

The present invention relates to automatic control equipment, for instance of the type which may be employed to maintain a desired condition of operation in a manufacturing technique; and is more particularly concerned with improved control circuits adapted for use in such equipment.

Various forms of control systems are known at the present time for maintaining a desired operating condition. Such circuits often utilized means responsive to the condition being controlled for producing a signal characteristic of the actual condition; and this signal is in turn normally compared with a reference signal, thereby to derive an error signal which may ultimately be utilized for restoring the condition under observation to a predetermined status. In general, control systems of the types described are relatively complex; are often inefficient in operation; and, in addition, are often somewhat less accurate than might be desired. These disadvantages of known circuits often arise primarily because of the circuits which are actually employed in deriving the aforementioned error signal, as well as because of the manner in which that error signal is employed for control purposes.

The present invention is particularly directed toward obviating these known disadvantages of prior circuits, and is concerned with the provision of an improved automatic control system as well as with the provision of a new amplifier arrangement for use in such systems.

It is accordingly an object of the present invention to provide an improved automatic control system.

Another object of the present invention resides in the provision of an improved amplifier arrangement adapted for use in a control system; the said amplifier arrangement being particularly characterized by the fact that it amplifies deviations in current from a predetermined current level.

Still another object of the present invention resides in the provision of a current deviation amplifier which is so constructed and arranged that it derives both its signal and operating voltages from the actual current being measured.

A still further object of the present invention resides in the provision of an improved automatic control system employing a novel current deviation amplifier as well as an improved output circuit associated with the said amplifier.

Still another object of the present invention resides in the provision of an improved control system finding particular utility in dielectric heating and drying applications; and in this respect the present nvention is particularly concerned with an improved system capable of maintaining a substantially constant load upon oscillators normally employed in such heating and drying applications.

Still another object of the present invention resides in the provision of an improved self-balancing network which is adapted to maintain a predetermined and desired operating condition through the derivation of an error signal representing deviations of said condition from its desired norm.

Still another object of the present invention resides in the provision of an improved deviation amplifier as well as in the provision of an improved control system employing such an amplifier wherein both the amplifier and system are simpler and more efficient in operation as well as less subject to operating failures than has been the case heretofore.

In providing for the foregoing objects and advantages, as well as in providing for other objects and advantages which will become readily apparent to those skilled in the art, the present invention contemplates the provision of an improved amplifier as well as an improved control system utilizing that amplifier for maintaining a desired operating condition. In accordance with a specific aspect of the present invention, the said desired operating condition may be related to the load upon an oscillator utilized in a dielectric heating or drying operation; and, as will be understood by those skilled in the art, such an oscillator should normally be maintained at full or at a predetermined high level of power output in order to effect most efficient operation thereof. As will be described subsequently, the load upon such an oscillator may be determined by grid current flow in the said oscillator, whereby variations in oscillator load are reflected into the oscillator grid current. In actual practice, the said oscillator grid current may exhibit a predetermined base or reference value under normal or optimum operating conditions; and variations in the load upon the oscillator and/or in the power output of the oscillator, appear as either increases or decreases in grid current from the aforementioned base or reference level.

In order to assure that the oscillator power output and/or load thereon is maintained at a constant level, therefore, it is particularly desirable to detect only deviations from the aforementioned reference level and to utilize these deviations for control purposes. In this respect, therefore, the present invention and the concepts thereof should be distinguished from other systems suggested heretofore, wherein the actual magnitude of a current or voltage is determined rather than the deviations in such a current or voltage from a preselected reference level.

In providing a control function in response to the aforementioned current or voltage deviations, the present invention is particularly concerned with an improved amplifier adapted to respond only to such deviations. As will be described subsequently, the current or voltage being measured is actually employed in accordance with the present invention to produce both signal and operating potentials for an improved deviation amplifier; and the several elements comprising the present invention are so constructed and arranged that the deviation amplifier produces a characteristic control output only when the quantity being measured deviates in one or the other direction from a preset base level. The amplifier output which occurs upon deviations in the quantity being measured, is applied to an improved bridge circuit; and means are also employed for impressing a standard or reference current upon the said bridge circuit. The said bridge circuit is, as will be described, designed to automatically perform a comparison function between these quantities thereby to provide an error signal, the magnitude and phase of which is characteristic of the magnitude and sense of current deviations from a preselected reference level rather than characteristic of actual current level.

When utilized in a dielectric heating or drying application, of the type mentioned previously, therefore, the characteristic error signal so produced may be and is utilized to control both the direction and speed of rotation of a motor which in turn continuously controls the rate of feed of articles being dried or heated in the said dielectric heating or drying application. Accordingly, the overall arrangement serves to vary the load upon the aforementioned oscillator in such a manner that the oscillator output is maintained at a preselected most efficient level; and this desirable result is achieved by the use of an improved network which is responsive only to deviations in oscillator power output from its optimum power level.

The foregoing objects, advantages, construction and operation of the present invention will become more readily apparent from the following description and accompanying drawings, in which:

Figure 1 is a block diagram illustrating an improved control system constructed in accordance with the present invention.

Figure 2 is a schematic diagram illustrating the improved current deviation amplifier and bridge circuit of the present invention.

Figure 3 is a schematic diagram of an improved switching network which may be employed under certain conditions of operation in the arrangement of Figures 1 and 2; and Figure 4 illustrates a motor control circuit such as may be employed in conjunction with the circuits of Figures 1 through 3.

Referring now to Figure 1, it will be seen that in accordance with the present invention, an improved control system employing the novel current deviation amplifier of the present invention may be associated with a dielectric heating or drying installation. In general, such a dielectric heating or drying system comprises an oscillator 10, the output of which is coupled to a pair of spaced electrodes 11; and an article 12 being heated or dried may be fed or otherwise placed between the said electrodes 11.

As is known to those skilled in the art, the actual load on oscillator 10 as well as the power output of the said oscillator 10 is determined by the nature of article 12; and in the particular instance of a drying application, such as the drying of fiber boards, the load upon and consequently the power output of oscillator 10 tends to decrease as the articles 12 become drier. This possible variation in oscillator load, and in resultant oscillator output, tends to detract appreciably from the efficiency of the system; and in certain applications may have an undesirable effect upon the operation of the oscillator itself. Accordingly, to assure that the oscillator 10 continues to operate at maximum efficiency, it is highly desirable that the power output of the said oscillator 10 be maintained at a preselected level, for instance by varying the rate of feed of articles 12 through electrodes 11.

This improved operation is accomplished in accordance with the present invention by detecting variations from the aforementioned optimum level in the oscillator output, and these variations or deviations from a preselected norm, optimum, or reference level are thereafter coupled to a deviation amplifier 13 of improved construction. The output of the said deviation amplifier 13 is thereafter coupled to a bridge circuit 14, wherein the said deviation amplifier output is also compared with a preset reference current level. As will be described subsequently, the bridge 14 is in fact energized by a source of alternating voltage whereby the output of the said bridge comprises an alternating error signal, the magnitude and phase of which are directly related to the magnitude and direction of the current deviation or power output deviation under observation; and this characteristic error signal is thereafter employed to control the rate of feed of the aforementioned articles 12 being heated or dried.

In accordance with one aspect of the present invention, the characteristics of the bridge circuit 14 may be improved by use of a gate 15 coupled to the output of bridge circuit 14; and one improved gate, such as may be employed, will be described subsequently in reference to Figure 3. It will be appreciated from the discussion which will follow that gate 15 is not mandatory and that, if desired, the error signal produced at the output of bridge 14 may be utilized directly for control purposes. This error signal is, in accordance with a particular form of the present invention, utilized to control a motor 16 which, in accordance with known techniques, may in turn be employed to control various hydraulic feeding mechanisms illustrated schematically by dotted line 17. The arrangement thus described in reference to Figure 1 comprises an improved control system responsive to voltage, current and/or power deviations only, and adapted to maintain a constant power output from oscillator 10 through a variation in the rate of feeding of a load impressed on that oscillator.

As has been mentioned previously, the concept of current deviation amplification, and the particular circuit employed to effect such amplification, comprises a specific feature of the present invention. Such a circuit is illustrated in Figure 2; and the particular circuit so illustrated is associated with an oscillator 10 as well as with a bridge 14, of the types already discussed in reference to Figure 1. In particular, referring to Figure 2, it should be noted that oscillator 10 may take any of many forms known to those skilled in the art. In general, however, such an oscillator comprises a grid controlled tube 20 having an output 21 which in normal circumstances is developed in a resonant tank circuit (not illustrated) whereafter energy in the said tank circuit may be transferred via a coupling coil to electrodes, such as 11 of Figure 1.

The grid 22 of oscillator 10 is normally returned to ground via grid resistance network diagrammatically illustrated as including series resistors R1 and R2; and resistors R1, R2 normally carry grid current, the magnitude of which varies with variations in oscillator power output. When oscillator 10 is associated with a control circuit of the type to be described, the oscillator grid may in fact be coupled to its associated grid resistor R1—R2 via an R.F. filter 19 which serves to block the passage of radio frequency currents from the oscillator into the control circuit. Filter 19 is conventional and may comprise known configurations of reactive components; and, as will be appreciated by those skilled in the art, direct current such as the oscillator grid current passes freely through filter 19. For purposes of the subsequent discussion, it will be assumed that the normal oscillator grid current flowing through filter 19 and through series grid resistors R1, R2 may be represented by the term $I_g$, and this normal grid current will develop a voltage $I_g$—R2 across the resistor R2 as well as a voltage $I_g$—R1 across resistor R1.

The voltage $I_g$—R2, developed across resistor R2 is, in accordance with the present invention, employed to provide both signal and operating potentials for my improved current deviation amplifier; and in particular, it will be seen that the said current deviation amplifier may comprise a grid controlled vacuum tube 23 having its cathode coupled to the junction of resistors R1 and R2. The anode of tube 23 is coupled via a saturable impedance L1 (comprising a portion of my improved bridge 14, to be described), and thence via line 19 to ground. Accordingly, it will be seen that the voltage $I_g$—R2 is directly impressed between the anode and cathode of amplifier tube 23. The varying voltage $I_g$—R2 thus provides the anode-to-cathode potential whereby the magnitude of anode current $I_p$, produced by tube 23, will vary with variations in the voltage $I_g$—R2.

The voltage appearing across resistors R1 and R2, in response to oscillator grid current flow therethrough, is also impressed across a series circuit comprising a resistor R3 and a pair of gas tubes 24 and 25; and therefore when the oscillator 10 is in fact operative, and when grid current flow actually passes through resistors R1 and R2, a substantially unvarying voltage will appear across the terminals of gas tubes 24 and 25. This substantially constant voltage is in turn impressed across a resistor R4; and a portion of this constant voltage is applied via line 26 to the control grid of tube 23. It should be noted that the voltage so applied to the control grid of tube 23 is of constant and predetermined magnitude; and, accordingly, so far as current deviation signals are concerned, the said amplifier tube 23 may be considered to have a grounded grid connection whereby variations in the cathode voltage of tube 23, due to variations in $Ig$, also effect variations in cathode-to-grid potential (i.e. signal potential) in tube 23. The actual amplification of the amplifier is predetermined, and the output of the amplifier varies additively in response to variations in cathode-to-grid potential as well as to variations in anode-to-cathode potential due to variations in oscillator grid current flow through resistor R2.

Considering the operation of the amplifier 13, shown in Figure 2, it should be noted that, in addition to performing a current deviation amplification function, the said amplifier also accomplishes a desired reduction in current reference level. In practice, the oscillator grid current flowing through resistors R1 and R2 may, in a dielectric heating or drying application, have a magnitude of several amperes; and inasmuch as the voltage produced across resistor R2, due to this grid current flow, is actually utilized to provide both signal and operating potentials for tube 23, the actual anode current $Ip$ is in the milliampere range. An increase in oscillator grid current through resistor R2 will simultaneously increase the cathode-to-anode potential as well as cathode-to-grid potential of tube 23 in positive directions, thereby increasing the anode current of tube 23; and a decrease in oscillator grid current will similarly effect a decrease in the deviation amplifier anode current.

Direct deviation amplification may be effected by determining the magnitude of oscillator grid current $Ig$ which is representative of optimum power output from oscillator 10; and by similarly determining the magnitude of amplifier anode current $Ip$ which is produced for this preselected base or reference level of grid current. By thereafter introducing thresholds into the system, for example by utilizing a standard or reference current for comparison purposes, a change in anode current from the aforementioned determined value can be immediately detected, and this deviation in anode current can be utilized directly for control purposes.

Thus, by using a grounded grid amplifier of the type illustrated in Figure 2, a direct amplification of the aforementioned grid current deviation is accomplished; and in actual practice, by employing a Type 6G6G tube for amplifier tube 23, it has been found that a 4 percent change in oscillator grid current yields a 56 percent change in vacuum tube 23 anode current, whereby the circuit employing tube 23 actually has a current deviation amplification of fourteen. The circuit is not only responsive to current deviations, therefore, but actually amplifies those deviations to provide the desired error or control signal.

As mentioned previously, the current deviation amplifier of the present invention is preferably associated with an improved output circuit taking the form of an impedance bridge, so that the actual error output signal produced from the overall system corresponds to the magnitude and direction of oscillator grid current deviation. The said bridge circuit is represented by the numeral 14 and comprises a pair of saturable reactors L1 and L2, as well as a potentiometer having resistive sections R6 and R7 interconnected in a conventional bridge configuration. Although saturable reactors L1 and L2 are shown symbolically as two windings upon a common core, it is to be understood, of course, that these reactors both operate in a conventional electrical manner customarily associated with saturable reactors. The bridge is energized by a source of 60-cycle alternating voltage impressed across the bridge between terminals $g$ and $h$; and the bridge output is taken between points $d$ and $e$ comprising, respectively, an adjustable tap $f$ on resistor R6—R7 and the junction between saturable impedances L1 and L2.

The control winding of saturable reactor L1 is, as mentioned previously, connected in the anode circuit of amplifier 23, whereby the actual impedance presented by reactor L1 in the 60-cycle bridge circuit varies with variations in amplifier anode current. A standard or reference current is also applied to the control winding of reactor L2, and this standard current, which has been designated in Figure 2 as $Is$, is derived from a tap on resistor R5 connected across the reference voltage output of gas tubes 24 and 25. In practice, bridge 14 is adjusted for two nulls, one of which corresponds to the condition wherein the anode current of tube 23 and the reference current $Is$ are both equal to zero (i.e. the first null is selected for that condition of operation wherein $Ip=Is=0$). The second null adjustment corresponds to that condition of operation wherein the anode current $Ip$ is equal to the predetermined or chosen reference anode current representative of proper oscillator operation (i.e. the second null adjustment is for that condition wherein $Ip=Ip_0$, where $Ip_0$ is a predetermined value of amplifier 23 anode current occurring under optimum power output conditions of oscillator 10).

In making these null adjustments, the oscillator 10 is initially de-energized whereby no oscillator grid current flows through resistors R1 or R2, no voltage appears across gas tubes 24, 25, and both $Ip$ and $Is$ are equal to zero. During this particular condition of operation, bridge 14 is, as mentioned previously, energized from the alternating source connected between terminals $g$—$h$, whereupon tap $f$ is adjusted until no voltage appears between terminals $d$ and $e$. Accordingly, the first null has been achieved, wherein $Ip$ equals $Is$ equals 0. With the tap $f$ maintained at this adjusted position, oscillator 10 is thereafter energized and caused to operate at its preselected optimum power output so that $Ip$ is equal to its chosen reference level $Ip_0$. The standard $Is$ is thereafter adjusted by variation of the position of the tap on resistor R5 until a second null is achieved, characterized by lack of output between terminals $d$ and $e$.

When so adjusted, therefore, the overall circuit illustrated in Figure 2 will produce no output across terminals $d$ and $e$ when oscillator 10 is de-energized or when it is energized and operating at its optimum preselected level. If, however, the oscillator is operative and the power output of oscillator 10 should deviate from its said desired optimum level, this power deviation will be reflected in a grid current deviation which will in turn change the operating and signal potentials on amplifier tube 23, and thereby cause a corresponding deviation in anode current $Ip$ from the aforementioned reference level $Ip_0$. The deviation in anode current so produced will vary the impedance of saturable reactor L1; and inasmuch as the impedance of saturable reactor L2 is fixed by the preset standard current $Is$ flowing therethrough, the bridge 14 will become unbalanced in one or an opposite direction by an amount and direction directly related to the magnitude and sense of deviation in anode current $Ip$. This unbalance of the bridge will, therefore, cause an alternating voltage to be coupled from source $g$—$h$ via the bridge to terminals $d$—$e$, and the actual magnitude as well as the phase of the alternating voltage thus appearing at terminals $d$—$e$ will be directly dependent upon the current deviation which is detected and amplified by the circuit of Figure 2.

Summarizing the overall operation of the circuit shown in Figure 2, it will be seen that the ultimate error signal produced is representative of a current deviation only; and this error signal is alternating in nature and has a magnitude which is directly related to the magnitude of both oscillator grid current deviation and amplifier anode current deviation from each of their predetermined reference levels. Moreover, the sense of the current deviation being detected is directly reflected in the phase of alternating output error signal across terminals d—e; and the said error signal will in fact exhibit a 180-degree reversal in phase as the deviation being detected passes through the preselected or predetermined current reference level. Accordingly, a characteristic error signal having both magnitude and phase information is provided at terminals d—e, and this error signal may be employed for any desired control function.

It should moreover be noted that when the particular bridge 14 is employed with the current deviation amplifier 13 already described, the output voltage of the overall circuit is self-limiting in nature, after a normal range of operation has been exceeded; and under such limiting conditions, all succeeding circuitry and electro-mechanical devices which might be employed are energized just to their maximum capabilities, whereby over-loading of the entire servo-system is impossible. As a matter of practice, the limiting values of output signal are reached when the oscillator grid current Ig deviates from its normal preselected reference level by plus or minus 12 percent, but this particular range of deviation is more than adequate to accomplish the desired control.

Before proceeding with a further description of one particular control network utilizing the aforementioned characteristic error signal, it should be recalled that the bridge 14, discussed previously, is actually balanced for two null points. In order that the bridge may realize two well-defined nulls, the aforementioned reactors L1 and L2 should preferably be electrically identical; and this requirement in turn may impose an undesirable requirement upon the circuit employed. As a practical matter, the circuit operates in the desired manner so long as bridge 14 functions above some lower limit of Ip; and accordingly, reactors L1 and L2 may be rendered insensitive to electrical matching by merely assuring that below the aforementioned lower limit of Ip the output voltage across terminals d and e automatically reduces to zero without any special adjustment.

In short, the only null which is actually required of the circuit is the null at which $Ip=Ip_0$; and the second null $Ip=Is=0$ may be completely eliminated by merely assuring that when Ip falls below its reference level $Ip_0$ by a selected quantity, the output from the bridge automatically ceases. This latter concept and operation may be accomplished by use of a gating or switching circuit which is responsive to the energization or de-energization of the aforementioned oscillator 10; and when such a gating or switching circuit is employed, therefore, the de-energization of oscillator 10 can be utilized to automatically prevent any output from appearing at terminals d—e.

One particular such switching or gate circuit which can be employed is illustrated in Figure 3; and the said switching circuit includes a pair of input points d—e which are connected to the output points d—e of Figure 2. It will be noted by examination of Figure 3 that point d is coupled via a capacitor C to one terminal of a gas tube 30; and a resistor R8 is connected in series with said gas tube 30 whereby an output voltage may be taken at terminals d'—e' across resistor R8. One terminal of gas tube 30 is also coupled via a resistor R9 to a point m which, as illustrated in Figure 2, may comprise the junction of the aforementioned resistors R1 and R3. When oscillator 10 of Figure 2 is de-energized, terminal m will be at substantially ground potential, and gas tube 30 will be extinguished, whereby any residual voltage appearing at terminals d—e is blocked from reaching terminals d'—e'. Upon energization of oscillator 10, however, point m will drop to a negative potential where-by gas tube 30 will fire; and alternating signals appearing across terminals d—e will therefore be coupled via capacitor C and gas tube 30 to develop an alternating voltage across resistor R8 which may be taken at output terminals d'—e'.

The arrangement of Figure 3 thus provides a simple but efficient switch, by recognizing that application of an alternating voltage across a fired gas tube results in corresponding current fluctuations through such a gas tube. Through appropriate circuit proportioning, the range of operation of the electronic switching system illustrated in Figure 3 may in fact reach to plus or minus 70 percent of possible oscillator grid current deviation; and this possible deviation range actually exceeds the practical requirements of the system, inasmuch as protective devices normally coupled to an oscillator such as 10 would cause oscillator de-energization long before such wide limits are reached. It must be emphasized, of course, that the gate of Figure 3, while particularly desirable in the overall arrangement thus far described, is not mandatory and can be eliminated, so long as proper balancing of reactors L1 and L2 is effected.

As has been mentioned previously, the error signal produced by the arrangement of Figure 2 can be employed in the system of Figure 1 for accomplishing variations in load feed rate, thereby to maintain a predetermined power output level in a dielectric heating or drying installation. The error signal may, as mentioned previously, be taken either from points d—e of Figure 2 or from points d'—e' of Figure 3; and this error signal, which varies in both amplitude and phase in accordance with oscillator grid current deviations, can in turn be utilized to vary the direction and speed of rotation of a motor which controls the feeding rate.

Various arrangements operative in this manner will be suggested to those skilled in the art, but one particular arrangement comprising block 16 of Figure 1, is illustrated in detail in Figure 4. In this latter arrangement, the varying amplitude and phase error signal is applied to the input of a phase shifting network 40, the output of which feeds a voltage and power amplifier 41 preferably having a maximum power output of 125 watts. The output of amplifier 41 is in turn utilized to provide armature current, properly phased through phase shifting network 40, for a motor 42 which may take the form of a substantially conventional commutator A.C. motor. Motor 42 includes a field winding 43, and this field winding 43 receives a constant energization of approximately 1.5 amperes from a variable voltage auto-transformer T which is in turn coupled to a source 44 of 60-cycle voltage.

It will be noted that the armature and field current thus supplied to motor 42 are of the same frequency, namely 60-cycles, and are of proper phase for efficient operation; and the input signal appearing at the input of phase-shifting network d—e may in fact vary between 0 and .2 volt in either of two possible senses, depending upon the current deviation detected by the amplifier and bridge arrangement of Figure 2. Phase-shifting network 40 is so selected that the alternating armature current applied via amplifier 41 to motor 42 is in phase with or 180 degrees out of phase with the motor field current appearing across winding 43; and inasmuch as the phasing of the motor field current is fixed, a phase reversal of the input signal will therefore always cause a reversal in the direction of motor rotation.

The motor arrangement of Figure 4 thus provides a system wherein both the direction and speed of rotation of the motor 42 are directly dependent upon the magnitude and phase of error signal applied thereto; and variation in the amplitude and phase of armature current may in fact change the motor speed from 0 to 5000 r.p.m. in both a clockwise and counter-clockwise direction. The arrangement of Figure 4 is particularly desirable in effecting control operations of the type discussed in reference to Figure 1 because of certain advantageous features exhibited by the overall motor arrangement described. For example, in addition to the variable speed and direction characteristics of the motor, the speed-torque characteristic of the motor can be readily varied merely by adjustment of the transformer T which regulates motor field current. The motor in fact has an exceptionally high starting torque which exceeds those of conventional inductive and series motors; and even though an alternating current motor is employed, the motor system exhibits strong torque about its "null-seeking" point, thus assuring nearly perfect tracking to the input voltage or error signal applied thereto.

Still other advantages of the motor arrangement of Figure 4 will become readily apparent to those skilled in the art, but it must be emphasized that this particular arrangement is not mandatory and other systems of control, responsive to the novel error signal achieved by the improved current deviation amplifier of the present invention, can be employed.

While I have thus described a preferred embodiment of the present invention, it must be emphasized that the foregoing description is meant to be illustrative only and should not be considered limitative of my invention. Various modifications will be suggested to those skilled in the art, and certain of these have already been discussed. Other variations will be readily apparent. For example, the individual portions of my overall system can be utilized in amplification and control systems other than those specifically described; and the individual portions of my overall control circuit in fact find utility apart from the overall control arrangement. Accordingly, all such variations and modifications as are in accord with the principles described are meant to fall within the scope of the appended claims.

For purposes of brevity, certain of the following claims include the abbreviations "D.C." and "A.C." These abbreviations are meant to be conventional, and are intended to refer to "direct current" and "alternating current" respectively.

Having thus described my invention, I claim:

1. In combination, a source of first D.C. current to be measured, an impedance coupled to said source for developing a potential which varies with variations in said first current, means for amplifying deviations in said current from a preselected reference D.C. current level comprising a grid controlled vacuum tube having an anode, cathode, and control grid, means coupling said impedance between the anode and cathode of said vacuum tube whereby the potential developed across said impedance comprises the operating and signal potentials for said vacuum tube, means for maintaining said control grid at a fixed potential whereby the anode current of said vacuum tube comprises a second D.C. current which varies in accordance with variations in said first D.C. current, means for producing a standard third D.C. current of predetermined fixed magnitude related to said preselected reference level of said first current, and means for comparing the magnitudes of said second and third currents.

2. The combination of claim 1 wherein said source of first current comprises an oscillator having a control grid, said impedance comprising a resistor connected to the control grid of said oscillator and adapted to carry direct grid current flowing in the control grid of said oscillator.

3. In combination, a source of first direct current to be measured, an impedance coupled to said source for developing a potential which varies with variations in said first current, means for amplifying deviations in said current from a preselected reference direct current level comprising a grid controlled vacuum tube having an anode, cathode, and control grid, means coupling said impedance between the anode and cathode of said vacuum tube whereby the potential developed across said impedance comprises the operating and signal potentials for said vacuum tube, means for maintaining said control grid at a fixed potential whereby the anode current of said vacuum tube comprises a second direct current which varies in accordance with variations in said first direct current, means for producing a standard third direct current of predetermined fixed magnitude related to said preselected reference level of said first current, and means for comparing the magnitudes of said second and third currents comprising a bridge circuit having two reactive legs each of which includes a saturable reactor respectively, means coupling said second direct current to the saturable reactor in one of said reactive legs, means coupling said third direct current to the saturable reactor in the other of said reactive legs, and an alternating source for energizing said bridge whereby said bridge, when unbalanced, produces an alternating output signal the magnitude and phase of which is related to the magnitude and sense of deviation of said first current from said preselected reference direct current level.

4. The combination of claim 3 including a motor, and control means responsive to the magnitude and phase of said alternating output signal for controlling the speed and direction of rotation of said motor.

5. The combination of claim 1 including a gas tube circuit coupled to said impedance for developing a constant control potential, said means for maintaining said control grid at a fixed potential comprising circuit means coupling at least a portion of said constant control potential to said amplifier control grid, said means for producing a standard third current comprising further circuit means coupled to at least a portion of said constant control potential.

6. In combination, an oscillator including a control grid, an impedance coupled to the control grid of said oscillator and adapted to carry oscillator grid current whereby a D.C. current the magnitude of which varies with variations in the power output level of said oscillator passes through said impedance during operation of said oscillator, an amplifier tube having an anode, cathode, and control grid, means for maintaining said control grid at a substantially fixed potential, means connecting said impedance between said anode and cathode whereby the potential developed across said impedance by said varying D.C. oscillator grid current flow therethrough provides operating and signal potentials for said amplifier tube, and means responsive to variations in anode current of said amplifier tube for detecting variations in the power output level of said oscillator.

7. In combination, an oscillator, an impedance coupled to said oscillator and carrying a direct current the magnitude of which varies with variations in the power output level of said oscillator, an amplifier tube having an anode, cathode, and control grid, means for maintaining said control grid at a substantially fixed potential, means connecting said impedance between said anode and cathode whereby the potential developed across said impedance by said varying direct current flow therethrough provides operating and signal potentials for said amplifier tube, switching means, an output circuit coupled to the anode of said amplifier tube via said switching means, coupling means for coupling said switching means to said oscillator whereby the state of energization of said oscillator controls the state of conductivity of said switching means, and means responsive to variations in anode current of said amplifier tube for detecting variations in the power output level of said oscillator.

8. In combination, an oscillator, an impedance coupled to said oscillator and carrying a direct current the magnitude of which varies with variations in the power output level of said oscillator, an amplifier tube having an anode, cathode, and control grid, means for maintaining said control grid at a substantially fixed potential, means connecting said impedance between said anode and cathode whereby the potential developed across said impedance by said varying direct current flow therethrough provides operating and signal potentials for said amplifier tube, switching means comprising a gas tube, an output circuit coupled to the anode of said amplifier tube via said switching means, and coupling means for coupling said switching means to said oscillator, said coupling means comprising means for controlling the firing of said gas tube whereby the state of energization of said oscillator controls the state of conductivity of said switching means.

9. In combination, a source of varying D.C. current, an impedance carrying varying D.C. current from said source whereby the potential across said impedance varies with variations in said current, an amplifier tube having an anode, cathode, and control grid, a source of stabilized voltage coupled to said control grid for maintaining said control grid at a fixed potential, means coupling at least portions of the varying D.C. potential across said impedance to said amplifier tube as both a varying D.C. supply potential between the anode and cathode thereof and as a varying D.C. signal between the cathode and grid thereof whereby the D.C. anode current of said amplifier tube varies with variations in said varying D.C. current, means coupled to said source of stabilized voltage for producing a standard D.C. current of fixed and preselected magnitude, and means for comparing the magnitude of said varying D.C. anode current with the magnitude of said standard D.C. current, said comparing means including means operative to produce an A.C. output signal varying in phase and amplitude in accordance with the results of said D.C. current comparison.

10. The combination of claim 9 wherein said source of varying current comprises an oscillator including a control grid producing a direct grid current which varies in magnitude with variations in the power output level of said oscillator, said impedance being connected to said control grid of said oscillator for carrying said varying oscillator grid current thereby to produce said varying D.C. potential across said impedance.

11. In combination, a source of varying direct current comprising an oscillator, an impedance comprising a component element of said oscillator carrying varying direct current from said oscillator related to the power output level of said oscillator whereby the potential across said impedance varies with variations in said current, an amplifier tube having an anode, cathode, and control grid, means for maintaining said control grid at a fixed potential, means coupling at least portions of the varying direct current potential across said impedance to said amplifier tube as both a varying direct current supply potential between the anode and cathode thereof and as a varying direct current signal between the cathode and control grid thereof whereby the anode current of said amplifier tube varies with variations in said varying direct current, means responsive to current flow through said impedance for producing a standard direct current of fixed and preselected magnitude, and means for comparing the magnitude of said varying anode current with the magnitude of said standard direct current comprising a bridge circuit including first and second variable impedances, means responsive to the magnitude of said varying anode current for controlling the magnitude of said first variable impedance, means responsive to the magnitude of said standard current for controlling the magnitude of said second variable impedance, and an alternating current source coupled to said bridge for energizing said bridge whereby said comparing means is operative to produce an alternating current output signal varying in phase and amplitude in accordance with the results of said direct current comparison.

12. In a dielectric heating system of the type wherein an electrode is utilized for producing a heating field, an oscillator for energizing said electrode, said oscillator having a grid circuit including an impedance carrying grid current produced by said oscillator, and varying with output variations of said oscillator, whereby said oscillator grid circuit impedance has a varying D.C. potential thereacross related to variations in power output level of said oscillator, an amplifier, means coupling said varying D.C. potential to said amplifier whereby the output of said amplifier comprises a D.C. current which varies with variations in power output level of said oscillator, means for producing a D.C. standard current related to a desired power output level of said oscillator, and means for comparing the D.C. output of said amplifier with said standard D.C. current thereby to detect both increases and decreases in oscillator power output level from said desired power output level.

13. The combination of claim 12 wherein said comparing means includes means producing an alternating output potential having an amplitude and phase related respectively to both the magnitude and sense of deviations in oscillator power output level from said desired power output level.

14. In a dielectric heating system of the type wherein an electrode is utilized for producing a heating field, an oscillator for energizing said electrode, said oscillator including an impedance having a varying direct current potential thereacross related to variations in power output level of said oscillator, an amplifier, means coupling said varying direct current potential to said amplifier whereby the output of said amplifier comprises a direct current which varies with variations in power output level of said oscillator, means for producing a standard direct current related to a desired power output level of said oscillator, means for comparing the direct current output of said amplifier with said standard direct current thereby to detect both increases and decreases in oscillator power output level from said desired power output level, said comparing means including means producing an alternating output potential having an amplitude and phase related respectively to both the magnitude and sense of deviations in oscillator power output level from said desired power output level, means for feeding articles to be heated past said electrode, and control means responsive to both the amplitude and phase of said alternating output potential for controlling the operation of said feeding means to smoothly increase and decrease the feed rate of said articles thereby to continuously maintain said desired oscillator power output level.

15. In a dielectric heating system of the type wherein an electrode is utilized for producing a heating field, an oscillator for energizing said electrode, said oscillator including an impedance having a varying direct current potential thereacross related to variations in power output level of said oscillator, an amplifier, means coupling said varying direct current potential to said amplifier whereby the output of said amplifier comprises a direct current which varies with variations in power output level of said oscillator, means for producing a standard direct current related to a desired power output level of said oscillator, means for comparing the direct current output of said amplifier with said standard direct current thereby to detect both increases and decreases in oscillator power output level from said desired power output level, said comparing means comprising a bridge circuit for producing an alternating current output signal varying in both phase and magnitude in accordance with said deviations in power output level, means including a shunt-wound alternating current commutator type motor for feeding articles to be heated past said electrode, and control means responsive to said output signal for coupling an alternating control signal to the armature of said motor for controlling the speed and direction of rotation of said motor thereby to continuously control the feed rate of said articles past said electrode.

16. The combination of claim 15 including signal switching means between the output of said bridge circuit and the input of said control means, and means responsive to the state of energization of said oscillator for controlling the state of conductivity of said switching circuit.

17. In combination, an oscillator having a grid circuit carrying a D.C. grid current, said grid circuit including an impedance responsive to variations in said grid current for producing a varying first D.C. potential thereacross, voltage regulator means coupled to said impedance and responsive to said varying first potential for producing a fixed second D.C. potential, an amplifier tube having an anode, cathode, and control grid, means coupling said anode to one end of said impedance, means coupling said cathode to the other end of said impedance, means coupling at least a portion of said fixed second D.C. potential to the control grid of said amplifier tube for maintaining said control grid at a fixed potential level, whereby variations in said varying first D.C. potential produce both anode-to-cathode and grid-to-cathode potential variations in said amplifier tube, so that the D.C. anode current of said amplifier tube varies substantially solely in response to variations in said oscillator grid current, and control means responsive to variations in said amplifier tube anode current for detecting variations in said oscillator grid current.

18. The combination of claim 17 wherein said voltage regulator means for producing said fixed second D.C. potential comprises means including a gas tube circuit coupled to said impedance, said control means including means responsive to said fixed second D.C. potential for producing a reference direct current of fixed magnitude, and means for comparing the magnitudes of said reference direct current and said amplifier D.C. anode current.

19. In combination, an oscillator having a varying power output, said oscillator including a grid circuit having a direct grid current therein which varies with variations in said oscillator power output, means responsive to variations in said oscillator grid current for producing a varying D.C. potential related to variations in the power output of said oscillator, an amplifier having an anode, cathode, and control grid, means coupling at least a portion of said varying D.C. potential between the anode and cathode of said amplifier thereby to produce a varying D.C. operating potential across said amplifier, and means coupling at least a portion of said varying D.C. potential between the cathode and control grid of said amplifier thereby to produce a varying signal input to said amplifier, whereby the D.C. anode current of said amplifier is dependent upon joint variations in both operating and signal potentials applied thereto in response to variations in the power output of said oscillator.

20. In combination, an oscillator having a varying power output, said oscillator including a control grid whereby the D.C. grid current of said oscillator varies with said variations in oscillator power output, means for monitoring said oscillator power output comprising an impedance coupled to said control grid and carrying said varying D.C. grid current whereby the D.C. potential across said impedance varies with variations in said oscillator power output, an amplifier coupled to said impedance for producing a further D.C. current, at a current level reduced from that of said grid current, which further D.C. current varies with variations in said oscillator grid current, means producing a standard current at said reduced current level, the magnitude of said standard current being related to a desired oscillator power output, and means for comparing said further D.C. current and said standard current to detect variations in said oscillator power output both above and below said desired output, said comparing means including means converting the results of said comparison to an A.C. control signal varying in both amplitude and phase in accordance respectively with the magnitude and sense of said oscillator power output variation relative to said desired output.

21. The combination of claim 20 wherein said amplifier comprises an amplifier tube having an anode, cathode, and control grid, means coupling at least a portion of the D.C. potential across said impedance between the anode and cathode of said amplifier tube thereby to provide a D.C. operating potential for said vacuum tube, and means coupling at least a portion of the D.C. potential across said impedance between the cathode and control grid of said amplifier tube to provide a D.C. signal potential for said amplifier tube, said further D.C. current being derived from the anode of said amplifier tube.

22. The combination of claim 21 including means maintaining the control grid of said amplifier tube at a fixed D.C. potential.

23. The combination of claim 20 wherein said comparing means comprises a bridge circuit energized by an alternating source, said bridge circuit comprising two saturable reactors connected to one another to form two legs of the bridge, and two resistor elements connected to one another to form the other legs of said bridge, means coupling said further D.C. current to one of said saturable reactors, means coupling said standard current to the other of said saturable reactors, and means for deriving said A.C. control signal from the junctions of said saturable reactors and of said resistor elements.

24. In combination, an oscillator having a variable power output level, means responsive to said variations in output level of said oscillator for producing a direct current the magnitude of which varies with variations in said oscillator power output level, an impedance, means for passing said varying direct current through said impedance thereby to develop a varying D.C. potential thereacross, an amplifier tube having an anode, cathode, and control grid, means coupling said anode to a first point on said impedance, means coupling said cathode to a second point, spaced from said first point, on said impedance, means for maintaining said control grid at a fixed D.C. potential level whereby variations in said varying D.C. potential produce varying operating and signal potentials for said amplifier tube thereby to produce a varying D.C. amplifier anode current having a current level reduced from that of said varying direct current, with variations in said varying direct current appearing amplified, at said reduced current level, in said amplifier anode current, and means responsive to variations in said reduced level amplifier anode current for controlling the power output level of said oscillator.

25. In combination, an oscillator having a varying power output, said oscillator including a control grid carrying a grid current the magnitude of which varies with said variations in oscillator power output, means for monitoring said oscillator power output comprising a resistive impedance connected to said control grid and carrying at least a portion of said varying grid current whereby the potential across said impedance varies with variations in said oscillator power output, an amplifier coupled to said impedance for producing a further current, at a current level reduced from that of said grid current, which further current varies with variations in said oscillator grid current, said amplifier including an anode and cathode connected respectively to spaced points on said impedance, and further including a control grid maintained at a fixed potential whereby said amplifier operates substantially as a grounded grid amplifier, means producing a standard current at said reduced current level, the magnitude of said standard current being related to a desired oscillator power output level, means for comparing said further current and said standard current to detect variations in said oscillator power output both above and below said desired output level, and means responsive to said comparing means for restoring the power output level of said oscillator toward said desired output level.

References Cited in the file of this patent

UNITED STATES PATENTS

| | | |
|---|---|---|
| 2,546,271 | McKenney et al. | Mar. 27, 1951 |
| 2,632,091 | Hagopian | Mar. 17, 1953 |
| 2,650,996 | Jaesche | Sept. 1, 1953 |
| 2,661,425 | Mittelmann | Dec. 1, 1953 |
| 2,679,621 | Houck | May 25, 1954 |
| 2,758,278 | Adams | Aug. 7, 1956 |